STOCKING

Original Filed July 17, 1959 2 Sheets-Sheet 1

INVENTOR.
JOSEPH V. CLARKE
BY Louis Nechs
ATTORNEY

INVENTOR
JOSEPH V. CLARKE
BY Louis Neeb
ATTORNEY

United States Patent Office

Re. 25,331
Reissued Feb. 19, 1963

25,331
STOCKING

Joseph V. Clarke, Elmhurst, N.Y., assignor to Prestige, Inc., New York, N.Y., a corporation of Pennsylvania Original No. 3,003,344, dated Oct. 10, 1961, Ser. No. 827,812, July 17, 1959. Application for reissue May 7, 1962, Ser. No. 193,661
12 Claims. (Cl. 66—172)

Matter enclosed in heavy brackets [ ] appears in the original patent but forms no part of this reissue specification; matter printed in italics indicates the additions made by reissue.

My invention relates to a stocking of the type shown in Burd and Clarke Patent No. 2,814,938 of December 3, 1957.

The object of the invention is to produce an improved stocking of the type set forth.

In the patent referred to there is shown a "roll edge" stocking, that is, a stocking provided with an upper marginal portion which, if not restrained, will roll down upon itself. This effect was brought about by knitting said marginal portion of textile covered rubber. The roll referred to forms a core on which the fabric of the stocking could be further rolled down, thereby making it possible for the stocking to be worn full length, or at some point, at or above, the knee, or it can be worn "knee high" with the roll just below the knee.

The stocking disclosed in my prior patent is satisfactory but textile covered yarn is relatively expensive, is hard to knit and presents an undesirable appearance when the necessarily thin textile covering wears off.

It is, therefore, a further object of the invention to produce an improved roll edge stocking of the type referred to without the use of any rubber yarn.

The full nature of the invention will be understood from the following specification and the accompanying drawings in which.

Figure 1:
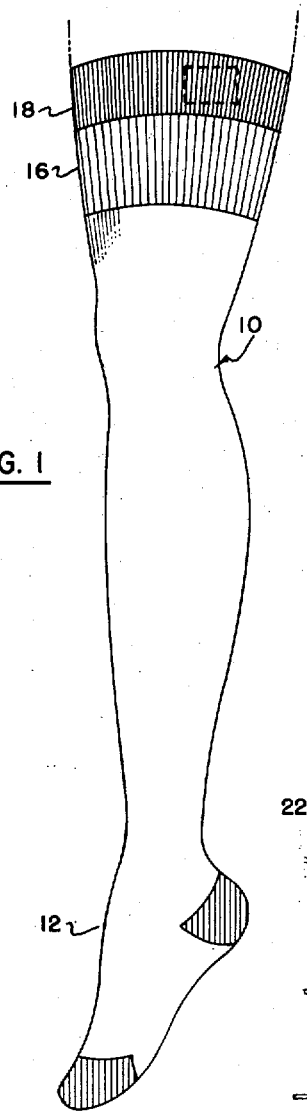
FIG. 1 is a perspective view of a stocking embodying the invention with the stocking worn at full length.

In FIG. 1 there is shown a conventional stocking which includes a leg 10, a foot 12, a single thickness welt 16, and an upper marginal portion 18 which embodies my invention.

Figure 3:
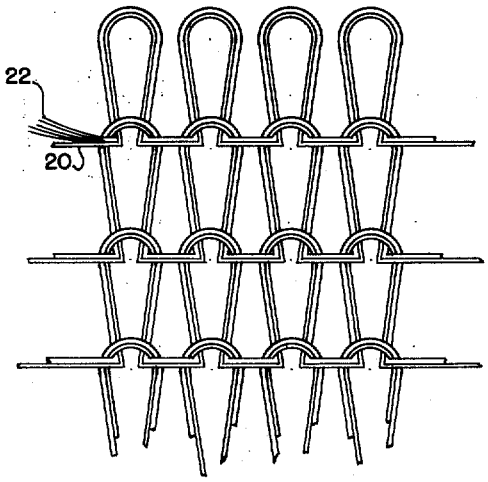
FIG. 3 is an enlargement of the bracketed area in FIG. 1.
Figure 4:
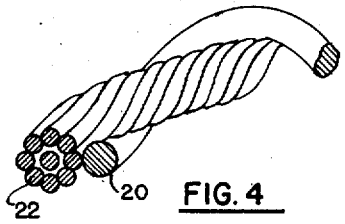
FIGS. 4, 5 and 6 are fragmentary perspective views showing different ways in which the yarns used in knitting the upper roll-down portion may be combined.

The marginal portion 18 of my invention is knit in the manner shown in FIG. 3 and, in one embodiment thereof, it is formed of a monofilament yarn 20 which may be made of nylon, Dacron, rayon or other synthetic material, and which is combined with a multi-filament yarn 22 which may be made of the same materials or of natural fibers such as silk as shown in FIG. 4. The mono-filament yarn is combined with a multi-filament because the mono-filament yarn, if used alone, will be too "lively" and will tend to roll too tightly for most purposes. But, when increased liveliness is desired, or is not objectionable, upper portion 18 may be knit of mono-filament 20 exclusively. The ratio of the denier of the monofilament yarn to the denier of the multifilament can vary and satisfactory results have been obtained by combining a 40 denier monofilament with a 70 denier multifilament yarn. But, experiments to date show that best results are obtained by combining a 40 denier monofilament yarn with a 50 denier multifilament yarn.

Figure 5:
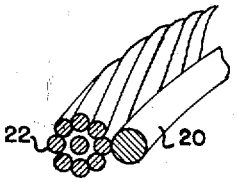
Figure 6:
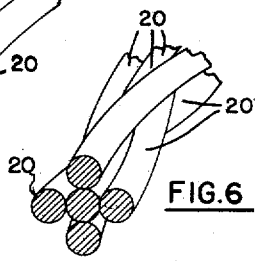

The mono-filament and multi-filament yarns 20 and 22 may be twisted together without the filaments of yarn 22 having first been twisted together, or the filaments of yarn 22 may be twisted together first and then twisted with the monofilament 20 as in FIG. 4. Alternately, the multifilaments may be twisted together and fed side by side with the monofilament, as shown in FIG. 5 and a satisfactory roll edge may be produced by twisting together a number of mono-filaments 20, as shown in FIG. 6. Also, upper roll portion 18 may be knit of the plain stitches shown in FIG. 3 or of any other stitches.

Figure 2:
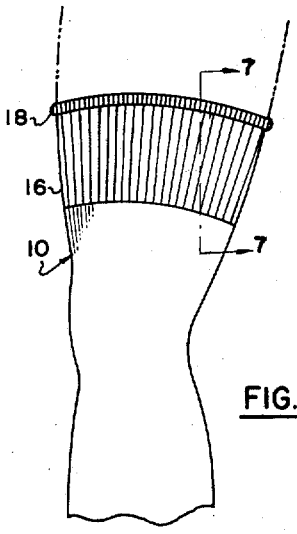
FIG. 2 is similar to FIG. 1 except that it shows the top marginal portion of the stocking rolled down.
Figure 8:
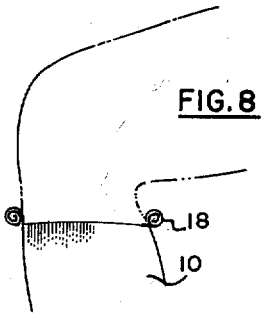
FIG. 8 is a fragmentary side elevational view showing how the stocking may be worn "knee-high" or just below the knee.

In all embodiments, when unrestrained, upper portion 18 will spontaneously roll down upon itself, as shown in FIG. 2, and will spontaneously stop when it reaches the welt of the stocking, if a welt is used, or when it reaches the fabric of the stocking itself, if the welt is omitted. In other words, only the marginal fabric knit of the combined mono and multifilaments as above set forth, will roll upon itself and it will stop at its junction with a fabric knit of the conventional yarn in the conventional manner. In practice, the fabric of the welt, when a welt is used, is knit of a smaller denier yarn, such as a 70 denier, or less, multifilament yarn, compared to yarns from which portion 18 is knit and which have a combined denier of 90. This, of course, does not prevent a person from rolling the welt down to sany point above the knee or from rolling the stocking down to the extent shown in FIG. 8, which shows the stocking worn "knee high" or below the knee. In fact, the bead formed by the spontaneous rolling of the upper portion 18 forms a core on which the adjacent portion of the stocking may be rolled more easily than if the roll is started with a flat edge.

Upper portion 18 may be of any desired width, but is preferably not less than one-half inch and, if a welt is formed, it, also, may be of any desired width and may be knit of any stitches, and of any yarns, because, as far as this invention is concerned, it is only necessary that the fabric adjoining roll portion 18 be knit of yarns of a different denier so as to limit the roll of upper portion 18 and, therefore, any narrow band of other knitting having a roll limiting characteristic will suffice.

Figure 7:
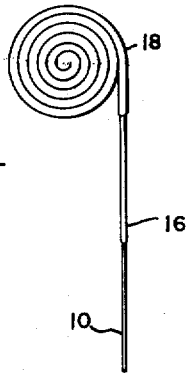
FIG. 7 is a greatly enlarged sectional view taken on line 7—7 on FIG. 2.

The presence of a thick bead, as exaggeratedly shown in FIG. 7, prevents the fabric therebelow from slipping through a garter if one is used, and the garter may be engaged with the roll itself instead of with the fabric therebelow.

A single thickness welt is much less expensive to make than a double welt but it has heretofore not found wide acceptance in the trade because its upper edge tends to curl and wrinkle, and fold down or move away from the skin and thus presents an untidy appearance and is uncomfortable besides. The roll edge of the present invention and the roll edge of the Burd and Clarke patent above mentioned, finishes off the edge of a single thickness welt in a very neat and attractive manner. It also causes the upper edge of the welt or stocking snugly, but comfortably, to hug the leg.

In order to provide a thick fabric for engagement with the supporting garter, it has heretofore been necessary to provide a double thickness welt. But, by my invention, the roll portion can be engaged by the garter and the fabric of the stocking leg can be continued all the way up to the lower edge of the roll portion 18 thus making it possible to eliminate the double thickness welt and the shadow welt usually interposed between the welt and the stocking.

What I claim is:

1. A stocking including a leg portion and a single thickness, upper marginal portion terminating in a selvedge edge, the courses of said marginal portion being knit of a mono-filament yarn combined with a multifilament yarn whereby, when released, said marginal portion automatically rolls upon itself to form a tight bead with the selvedge edge at the center thereof.

2. The structure recited in claim 1 in which at least said monofilament is a synthetic yarn.

3. The structure recited in claim 1 in which the denier of the mono-filament is about equal to the denier of the multifilament.

4. The structure recited in claim 1 in which said monofilament yarn is synthetic and said multifilament yarn is a natural fiber.

5. The structure recited in claim 1 in which said monofilament yarn is from about 40 to about 50 denier and said multifilament yarn is of about 50 to about 70 denier.

6. The structure recited in claim 1 in which the monofilament and the multi-filament yarns are synthetic.

7. A stocking including a lower portion for enclosing the leg and the knee, and an upper, single thickness, marginal portion, the courses of said upper portion being knit of a mono-filament yarn combined with a multi-filament yarn, with the combined denier of said mono- and multifilament yarns greater than the denier of the yarn of which said lower portion is knit whereby, when unrestrained, said upper marginal portion rolls down to form a bead at the upper edge of said lower portion.

*8. A knitted stocking having a leg portion, a single thickness welt, and a marginal edge portion knit of a synthetic lively mono-filament yarn, the marginal portion having courses knit of loops of a yarn of a different denier than the welt yarn, said marginal portion when unrestrained spontaneously rolling upon itself to form a tight core.*

*9. In the combination of claim 8, said marginal portion yarn being nylon.*

*10. In the combination of claim 8, said spontaneous rolling to form said core stopping at the juncture between said marginal portion and said welt.*

*11. In the combination of claim 8, said core forming a foundation upon which the welt can be rolled to provide a stocking of different lengths when worn.*

*12. A knitted stocking having a leg portion, a single thickness welt, and a marginal edge portion knit of a synthetic lively mono-filament yarn, said marginal portion when unrestrained spontaneously rolling upon itself to form a tight core.*

References Cited in the file of this patent or the original patent

UNITED STATES PATENTS

| | | |
|---|---|---|
| 2,042,582 | Botts | June 2, 1936 |
| 2,176,968 | Hinchliff et al. | Oct. 24, 1939 |
| 2,332,738 | Meade | Oct. 26, 1943 |
| 2,474,375 | Shearer et al. | June 28 1949 |
| 2,574,737 | Goodchild | Nov. 13, 1951 |
| 2,636,369 | Tait | Apr. 28, 1953 |
| 2,795,123 | Schumann | June 11, 1957 |
| 2,814,938 | Clarke et al. | Dec. 3, 1957 |
| 2,852,834 | Engelhard | Sept. 23, 1958 |
| 2,853,865 | McDonough | Sept. 30, 1958 |

FOREIGN PATENTS

| | | |
|---|---|---|
| 564,278 | Canada | Oct. 7, 1958 |
| 1,115,840 | France | Jan. 16, 1956 |